Aug. 12, 1952   G. M. DINNAN   2,606,612
TIRE TRIMMER
Filed April 20, 1950
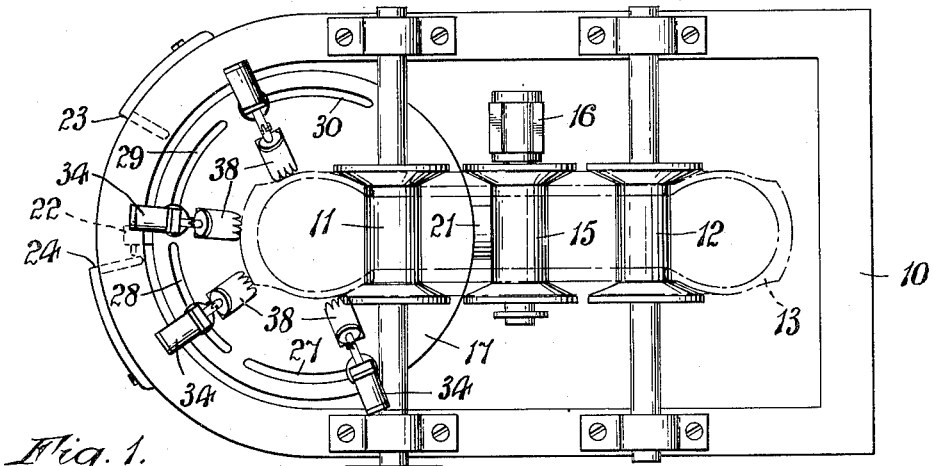
Fig. 1.
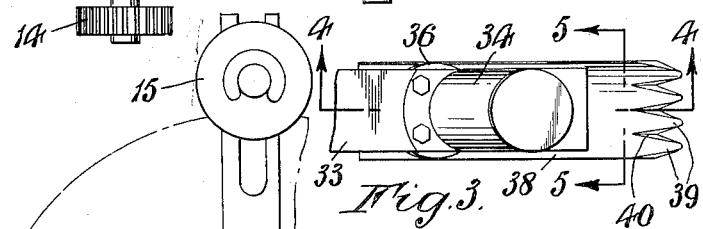
Fig. 3.
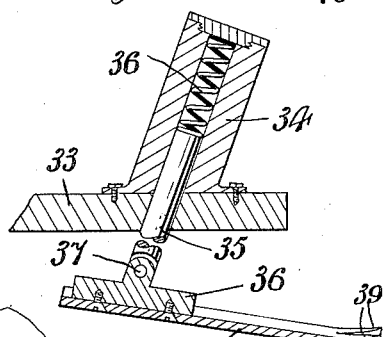
Fig. 4.
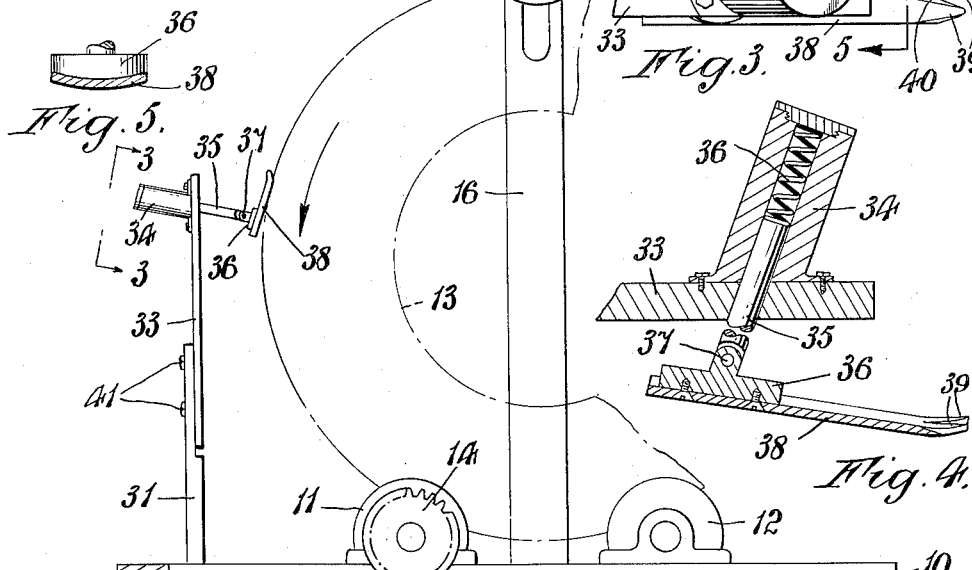
Fig. 5.
Fig. 2.
INVENTOR.
Gary M. Dinnan
BY
Stanley Lightfoot
Attorney Patented Aug. 12, 1952

2,606,612

UNITED STATES PATENT OFFICE 2,606,612

TIRE TRIMMER

Gary M. Dinnan, Detroit, Mich.

Application April 20, 1950, Serial No. 157,164

9 Claims. (Cl. 164—34)

This invention relates to mechanical means for trimming a tire casing after molding to remove the fins and filaments resulting from the overflow of the mold. This overflow, which is squeezed out between mold elements or through small openings provided in the mold for that purpose to facilitate escape of excess rubber in the molding operation, is usually found along the center line and along the edges of the tread and also extending from the sidewalls of the casing at widely spaced intervals extending from some distance above the bead or collar to some distance below the said tread.

The sidewalls of the casing are usually provided with raised lettering, or other raised markings, and it is necessary that removal of the fins and other objectionable extrusions be effected without damage to such lettering or markings, and also that grooving or damaging of the tread or sidewall surface be avoided. Accordingly, it has been the common practice to remove these fins and extrusions by means of a hand tool while the tire casing was rotated before the operator by suitable means, the operator manually controlling the movements of the knife or tool to avoid inflicting the damage referred to.

The present invention has for its object to provide a tire trimming machine adapted to quickly and sufficiently remove these webs or extrusions in the desired manner without resorting to the use of hand tools and by means of a series of simultaneously operating knives arranged to oscillate in an arcuate manner substantially about the circular center line of the casing, whereby the entire surface of the casing from which such fins extend will be transversed by the knives as the casing is rotated about its axis.

A further object is to provide, in such a machine, an arrangement whereby a plurality of such knives in performing their arcuate motion will overlap the paths of one another, insuring the complete shearing of fins or extrusions from the surface traversed by said overlapping paths.

A further object in the invention is to provide means whereby the knives are supporting and guided in a manner making them readily adaptable to the trimmer of tires of various sizes within reasonable limits.

A still further object is to provide for the adjusting and regulation of the arcuate spacing of the knives with respect to one another; and still further to provide for angular adjustment of the said knives relative to the tangent or to the surface of the tire casing.

Still further, the said invention provides for the utilizing in such a machine of a form of knife having its cutting portion of an arcuate formation in cross-section, whereby it will be readily adaptable to meet cutting conditions resulting from a difference in the curvature of the surface over which it travels and the arc through which the knife is oscillated.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein:

Figure 1 is a plan view of a tire trimming machine embodying the said invention;

Figure 2 is a side elevation of the same with the frame structure partly broken away and in section to disclose the timing mechanism. For the sake of clarity of illustration, only one of the trimming blades and its support is shown in this figure;

Figure 3 is a detail view of one of the trimming blades and its support as viewed in the direction of the arrows 3—3 in Figure 2;

Figure 4 is a detail sectional view through the said blade and its support taken on a plane indicated by the line 4—4 in Figure 3; and Figure 5 is a cross-sectional view through the said blade taken on a plane indicated by the line 5—5 in Figure 3.

Similar characters in reference indicate similar parts in the several figures of the drawing.

The machine is shown as comprising a base structure 10 carrying a spaced pair of flanged rollers 11 and 12 adapted to support a tire casing 13, as shown, the shaft of the roller 11 being provided with means, such as a gear 14, whereby the said roller may be rotated to impart rotation to the said tire casing about its own axis. 15 indicates an idler roller shown as being mounted for free vertical movement on an upstanding post 16 whereby this idler roller may rest by gravitation on the upper-most part of the tire casing in order to maintain the said tire casing in a vertical plane while being rotated.

Within the structure 10 is arranged a horizontal disc or spider 17, rotatable on a central supporting spindle 18 which is shown as carrying a worm wheel 19 with which a worm 20 meshes, this worm 20 being driven by a reversible motor 21 so that, by the timed reversing of the operation of the said motor, the said disc or spider 17 may be given an oscillating motion through a predetermined arc of rotation.

As a simple means of determining the extent of this arc of rotation, I show the said disc or spider 17 as carrying a reversing switch 22 (types of which are well known and do not call for description herein), this reversing switch being subject to actuation by adjustable stops 23 and 24 mounted on the framework of the structure 10 and adjustable arcuately both as to position and as to spacing about the periphery of the said disc or spider 17. 25 indicates the cable connection between the reversing switch and reversible motor 21.

The axis of the vertical spindle 18 is preferably substantially tangent to the circular center line of the body of the tire casing, although this may vary within reasonable limits with different sizes and shapes of casing which the machine may be designed to accommodate.

The disc 17 is shown as being provided with four arcuate slots 27, 28, 29, and 30 near its periphery more or less closely approaching each other and extending in this example as a group throughout somewhat more than one-half of the circumference of the said disc. In each of these slots is mounted a vertical post 31 adapted to be secured, as by the nut 32, in positions of adjustment along its particular slot.

Each post 31 is provided with an adjustable extension 33 carrying a cylinder 34 in which a plunger 35 is slidable, under the urging of a spring 36, in the general direction of the axis of the tire casing 13. The outer end of this plunger 35 carries a hingedly connected shoe 36 which may be secured at positions of hinged adjustment by a locking bolt 37.

38 is a trimming blade secured to and carried by the said shoe 36, the upper end of the said trimming blade being provided with a series of blunt end teeth 39 sharpened at the root 40 as shown, and for reasons which will appear, I prefer to make this blade curved in cross-section as clearly shown in Figure 5.

In operation, the tire casing 13 is positioned on the rollers 11 and 12 and beneath the roller 15, as shown, for rotation in the direction indicated by the arrow in Figure 2 and the blades 38 are secured in their most desirable angular relation to the surface of the casing by setting the hinge bolt 37 as will be obvious.

Two of the blades 38 are positioned, by lateral adjustment of the posts 31 in the slots 28 and 29 of the oscillating plate 17, whereby these two blades occupy a spacing materially less than the width of the tread of the tire; and the other two blades 38 are positioned, by adjustment of their posts 31 in the slots 27 and 30, so that when one of them is opposed to that portion of the side wall of the tire adjacent the collar or bead (as in the case of the lower-most blade shown in Figure 1) the other blade will be positioned against that part of the side wall which is adjacent to the tread of the casing.

Thus it will be apparent that oscillation of plate or spider 17, as by the means previously described and governed by the timed operation of the reversing switch 22, will result in the two outer-most of the said blades travelling backwards and forwards over the surface of the side walls of the casing, while the casing is at the same time being rotated on its axis, whereby all of the said surface of the side walls from which undesirable fins or extrusions project will be thoroughly transversed by the blades and such extrusions caused to enter between the teeth 39 of the blades and be cleanly severed from the tire casing by the cutting edges 40 at the roots of the said teeth.

Similarly, the two knives opposed to the tread of the tire will oscillate laterally thereover, performing the same function and overlapping in their paths at the center of the tread so that complete removal of fins or extrusions at the edges and throughout the center portion of the said tread will result.

The biassing of the blade plunger 35, such as by spring means 36, regulates pressure of the blades against the tire casing and permits the yielding accommodation of the blades to normal unevenness of the surface over which they travel, such as their passage over raised lettering or tread design formations which would not have a tendency to enter the narrow spaces between the teeth of the blades and would be freely ridden over by reason of the upwardly bent nature of these teeth, as shown in Figure 4.

I prefer to make these blades 38 somewhat arcuate in cross-section, as shown in Figure 5, so that, as they are oscillated over the surface of the tire casing in the manner described, a portion of the arcuate blade will at all times be properly presented in an efficient cutting manner to such surface even in such cases as where the oscillating movement of the blade about the tire casing does not truly agree with the actual radius of that part of the casing over which it is traveling. Where the radii of the surfaces being trimmed and that of the oscillating movements of the knives is in substantial agreement, the cross-sectional curvature of the blades referred to may be dispensed with.

I prefer to set the axes of the cylinders 34 at an angle to the radius of the tire casing, as a compromise, so that the said blades when urged toward the tire axis may more readily accommodate themselves to tire casings of somewhat different diameters within reason. I propose, however, to further provide, through the agency set screws 41, for locking of the post extensions 33 in positions of longitudinal adjustment on the said posts 31 whereby the blades 38 may be raised or lowered to positionally adapt them to tire casings of various sizes.

This invention may be developed within the scope of the following claims without departing from the essential features of the said invention, and it is desired that the specification and drawing be read as being merely illustrative of a practical embodiment of the same and not in strictly limiting sense.

What I claim is:

1. In a machine for trimming mold overflow from a tire casing, the combination of means for supporting and effecting continuous rotation of a tire casing about its axis, an oscillating blade support having an axis of oscillation substantially tangent to a circle whose center lies in the axis of rotation of said tire casing and whose perimeter defines the annular center line of the body of said casing, timed motion-reversing means for determining the extent of oscillation of said support, and a series of blades carried by said support, said blades having cutting edges opposed to the sidewalls and tread of said tire, and directed contrary to the direction of rotation of said tire, whereby the oscillation of said support will effect lateral travel back and forth of said blades over the surface of the side walls and tread of said casing while said casing is being rotated about its axis by said first mentioned means.

2. The combination of claim 1, including adjustable means for varying the relative lateral spacing of the blades of said series.

3. The combination of claim 1, including biasing means for yieldably urging said blades against the surface of the tire casing.

4. The combination of claim 1, including adjustable hinges for said blades whereby their angle of presentation to the tire casing may be regulated, and locking means for securing the blades in positions of such angular adjustment.

5. In a machine for trimming mold overflow from a tire casing, the combination of means for supporting and effecting continuous rotation of a tire casing about its axis, an oscillating blade support, having an axis of oscillation substantially tangent to a circle whose center lies in the axis of rotation of said tire casing and whose perimeter defines the annular center line of the body of said casing, timed motion reversing means for determining the extent of oscillation of said support, a plurality of arms extend from said support and parallel with the axis thereof, a blade carried by each of said arms, said blades being presented to and laterally spaced about the side walls and tread of said tire, the lateral spacing of said blades being such that the oscillation of said support will effect lateral travel back and forth through overlapping paths on the surface of the side walls and tread of said casing while said casing is being rotated about its axis by said first mentioned means.

6. The combination of claim 5, in which said arms are adjustable as to arcuate spacing on said support.

7. The combination of claim 5, in which said arms are adjustable as to length to vary the spacing of said knives from said support.

8. The combination of claim 5, in which said arms are adjustable as to length and are further adjustable as to arcuate spacing one from another.

9. The combination of claim 1, wherein the said blades are of arcuate cross-section with the curvature in opposition to the cross-sectional curvature of the tire casing.

GARY M. DINNAN.

REFERENCES CITED

The following references are of record in the file of this patent:

UNITED STATES PATENTS

| Number | Name | Date |
|---|---|---|
| 2,034,662 | McLaughlin et al. | Mar. 17, 1936 |
| 2,158,167 | Wikle | May 16, 1939 |
| 2,229,713 | Wikle | Jan. 28, 1941 |
| 2,524,489 | Strong | Oct. 3, 1950 |